Figure 1:
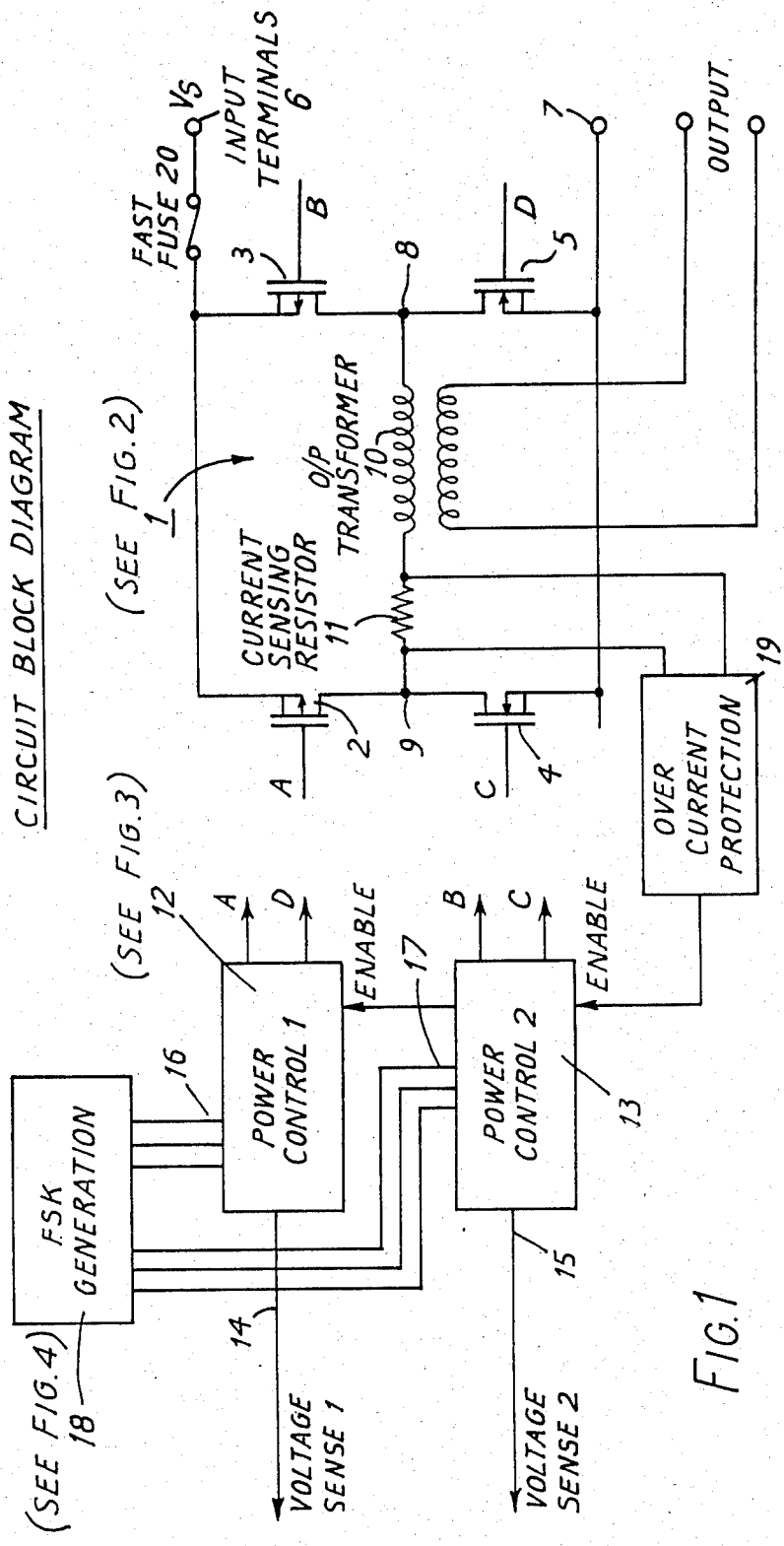

United States Patent [19]

Cowen

[11] Patent Number: 4,636,933
[45] Date of Patent: Jan. 13, 1987

[54] POWER CONTROL CIRCUIT WITH DIGITAL PULSE WIDTH CONTROL

[75] Inventor: David W. Cowen, Corsham, United Kingdom

[73] Assignee: Westinghouse Brake and Signal Company Limited, Chippenham, United Kingdom

[21] Appl. No.: 757,219

[22] Filed: Jul. 19, 1985

[30] Foreign Application Priority Data

Jul. 30, 1984 [GB] United Kingdom ................ 8419373

[51] Int. Cl.⁴ .......................................... H02M 7/529
[52] U.S. Cl. .................................. 363/98; 246/34 CT; 363/56
[58] Field of Search ............................ 363/41, 56, 98; 246/34 R, 34 CT, 187 R; 323/299

[56] References Cited

U.S. PATENT DOCUMENTS

| 4,320,880 | 3/1982 | Sibley ........................... 246/34 CT |
| 4,454,573 | 6/1984 | Petsch et al. ........................ 363/98 |

FOREIGN PATENT DOCUMENTS

| 153569 | 9/1982 | Japan ..................................... 363/41 |
| 26572 | 2/1983 | Japan ..................................... 363/56 |
| 720636 | 3/1980 | U.S.S.R. ................................ 363/98 |
| 964904 | 10/1982 | U.S.S.R. ............................... 363/98 |

Primary Examiner—William H. Beha, Jr.
Attorney, Agent, or Firm—Nilsson, Robbins, Dalgarn, Berliner, Carson & Wurst

[57] ABSTRACT

A bridge network 1 of current switching devices 2, 3, 4, 5 is operated in full wave manner by controlling signals A, B, C, D respectively produced by two similar, parallel and pulse width modulated power control circuits 12, 13 connected to receive a common input signal, one pair of opposing switch devices (2, 5) being controlled by one circuit 12 and the other pair 3, 4 being controlled by the other circuit 13. The pulse width control inputs 14 of the circuits 12, 13 are connected to voltage sensing means in the bridge supply circuit so that the pulse width of the control signals A, B, C, D is determined in accordance with the bridge supply level. The arrangement is such that the control circuits 12, 13 although not be designed to fail-to-safety standards operate in a fail-safe manner to provide a constant level output of the input signal.

7 Claims, 5 Drawing Figures

POWER CONTROL CIRCUIT WITH DIGITAL PULSE WIDTH CONTROL

The invention relates to a power control circuit, and in particular to a power control circuit having fail-safe characteristics and which operates to tend to maintain a power output at a constant level independently of supply voltage variations.

A circuit in accordance with the present invention is found to be particularly useful in a railway jointless track circuit transmitter in which it is desired to transmit a track circuit carrier frequency at a constant power level regardless of supply voltage variations. The circuit is also required to possess fail-safe characteristics so that it shall not be possible, in the event of any failure, to inject into the output a signal having a power greater than a predetermined level.

According to the invention there is provided a power control circuit comprising a bridge of controllable switching elements, a voltage supply connected to the bridge input terminals, an output circuit connected to the bridge output terminals, pulse width modulated control means providing two anti-phase control signals the pulse widths of which are determined in accordance with the voltage supply level, the control terminals of the two diagonally opposite pairs of the switching elements being connected to respective ones of the control signals in a sense that the pulse width modulated signals tend to maintain the output power at a predetermined constant level.

Preferably the pulse width control means is operated in accordance with a predetermined alternating frequency signal, such as for example in the instance of a track circuit transmitter this is a coded carrier signal.

The bridge voltage supply connection also includes a fuse means, the rating of which is such that it will be exceeded by the current drawn if two adjacent but normally anti-phase switching elements of the bridge conduct simultaneously to effectively short-circuit the power supply.

Figure 2:
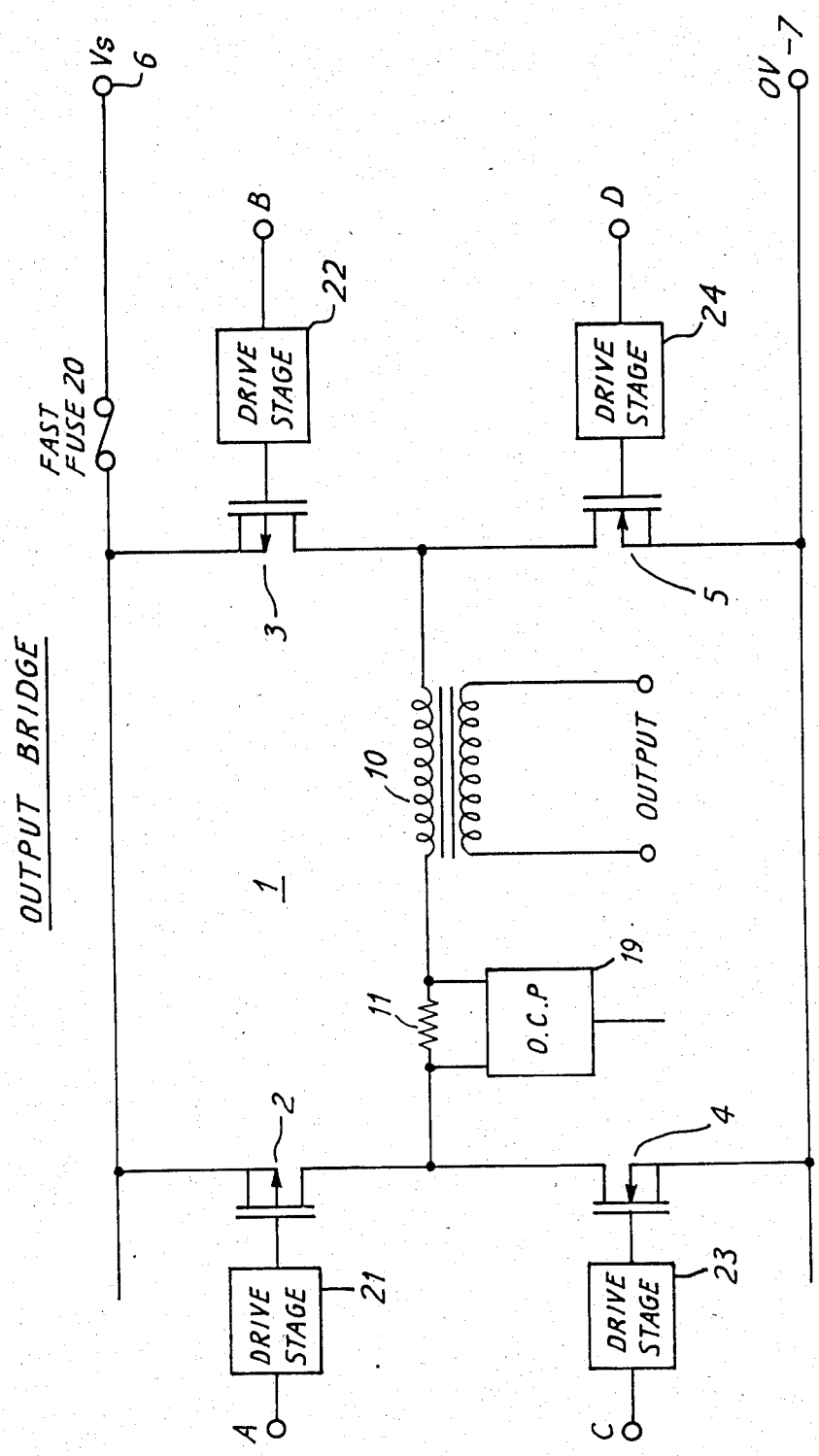
Figure 3:
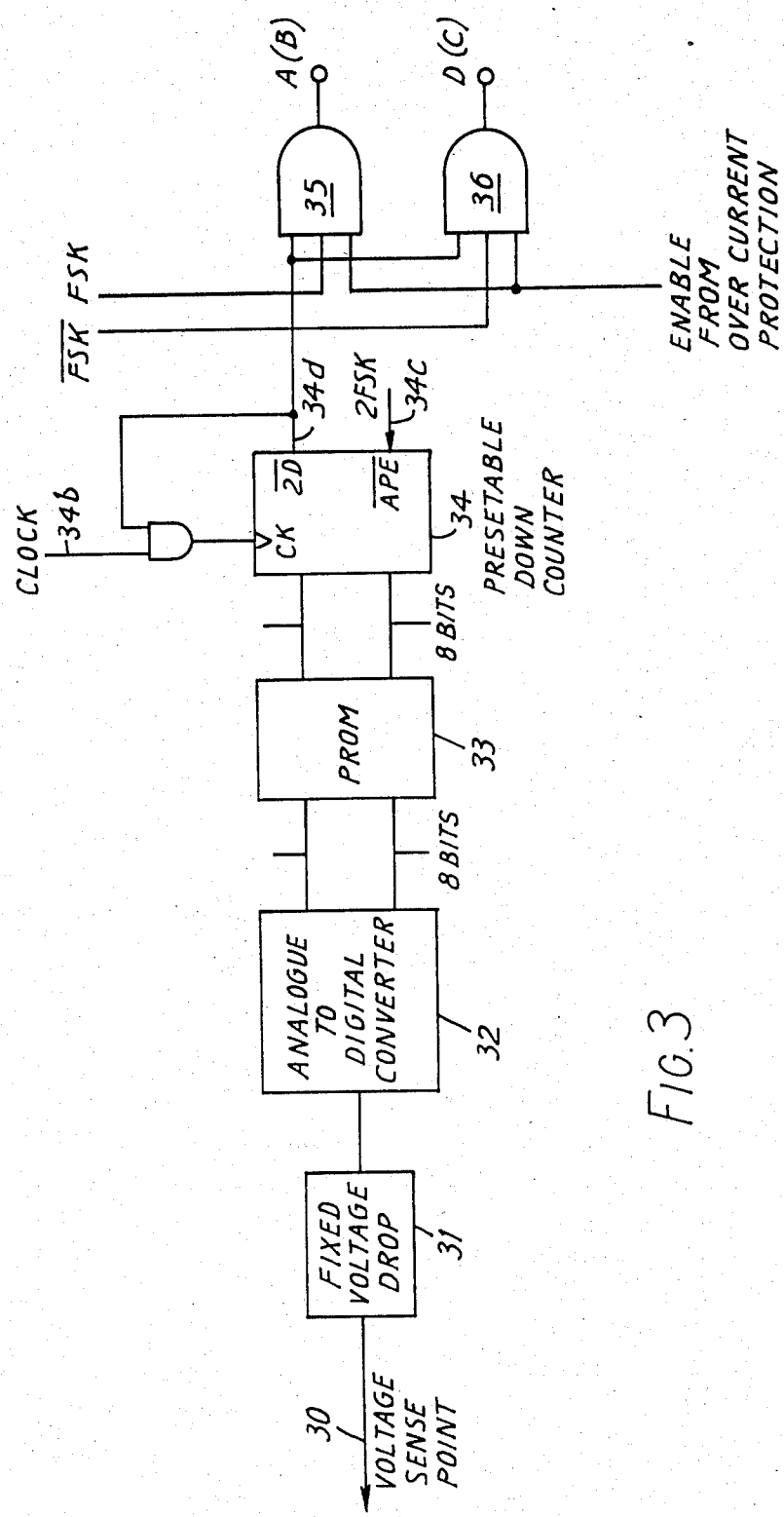
Figure 4:
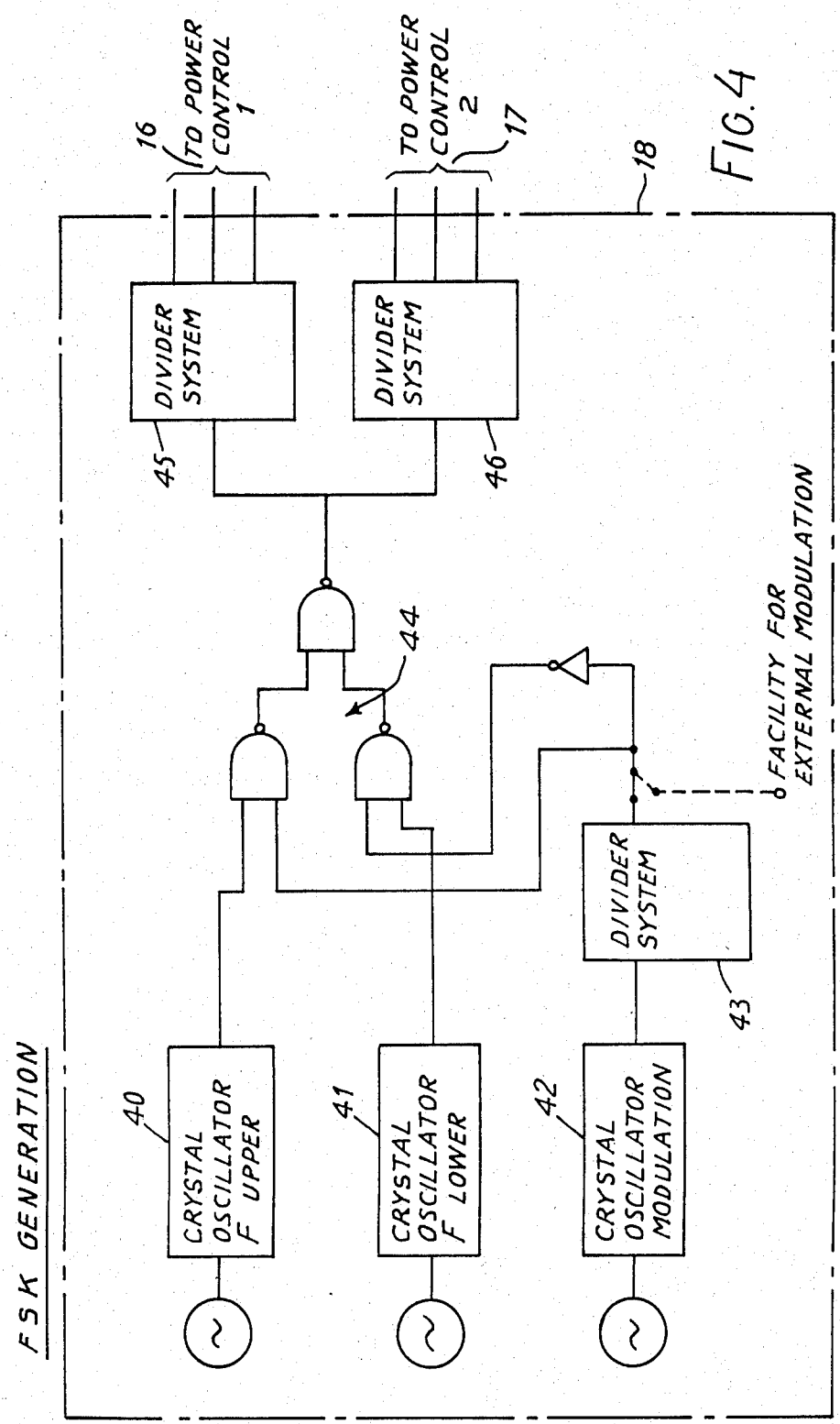
Figure 5:
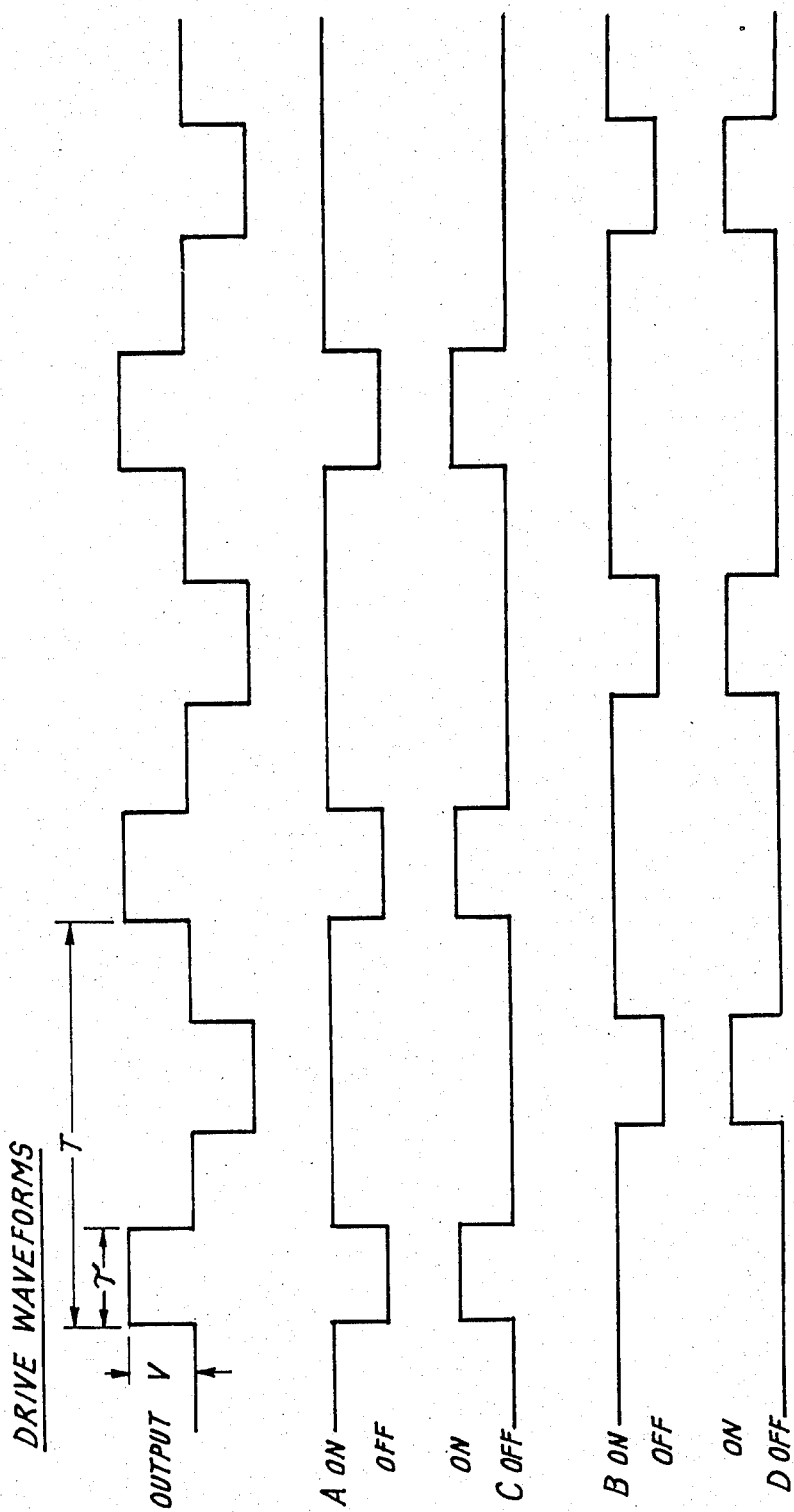

The invention and a particular embodiment thereof will now be described, by way of example only, with reference to the accompanying drawings, in which;

FIG. 1 shows a schematic diagram of the circuit of a jointless track circuit transmitter, FIG. 2 shows the switching bridge of FIG. 1 in more detail, FIG. 3 shows a schematic diagram of a power control circuit of FIG. 1, FIG. 4 shows a schematic diagram of a coded signal generator for the transmitter of FIG. 1, and FIG. 5 shows a wave form diagram illustrating the operation of the circuit of FIG. 1.

Referring now to the power control circuit shown in FIG. 1 there is shown at 1 a bridge of controllable switching elements 2, 3, 4 and 5 comprising four field effect transistors, of suitable current capacity, connected in a conventional bridge layout in which a voltage supply source is connected between input terminals 6 and 7 and the output is taken between bridge nodes 8 and 9 via an output transformer 10 connected between node points 8 and 9. Also, in series with the primary winding of transformer 10 there is connected a current sensing resistor 11 i.e. a resistor of very low resistance value, and in parallel therewith an overcurrent sensing circuit to which further reference will be made below.

The gate control terminals of the switching elements 2, 3, 4 and 5 are connected so that diagonally opposite pairs of elements in the bridge are operated by a common signal, and the two pairs are operated by anti-phase signals. These signals are provided by power control circuits represented by blocks 12 and 13, connected respectively according to the notation shown in FIG. 1. The circuits contained within the control blocks 12 and 13 are identical and each is responsive to two inputs, first inputs 14 and 15 respectively which sense the voltage level of the voltage supply connected to bridge input terminals 6 and 7, and second inputs 16 and 17 which operate the switching controls in accordance with the desired alternating frequency characteristics required in the final power output appearing across the terminals of the secondary winding of output transformer 10. The inputs 16 and 17 are connected to a further block 18 comprising, in the present example a frequency shift keyed generator.

There is connected in parallel with the current sensing resistor 11 a circuit 19 responsive to a potential difference developed across the resistor 11 by an output current, and the circuit of block 19 provides an alternative enable or inhibit output which is connected to provide a third input to the control circuits 12 and 13, in a manner to be described in further detail with the reference to FIG. 3.

There is also connected in series with the input terminal 6 of the bridge 1, a fast acting, current sensitive fuse element, or circuit breaker 20, the purpose of which will also be described in further detail below.

Referring now to FIG. 2, in which like parts have like references, there is shown an enlarged circuit diagram of the bridge 1. The controls signals for the switching elements 2, 3, 4 and 5 are connected to respective control terminals labelled A, B, C and D and to the control gates of the respective switching elements via drive stage circuits indicated at 21, 22, 23 and 24. The switching elements 2 and 5, which form one diagonal pair of elements are operated by control signals from the first control circuit 12. The alternate pair of switching elements 3 and 4 are also driven in common by an anti-phase signal provided by the second control circuit 13.

One form of power control circuit, suitable for block 12 and 13, is illustrated in FIG. 3. Other forms of circuit design are suitable. The one presently being described employs digital techniques and was selected, inter alia, for the ease with which the operating frequencies can be altered.

In the power control circuit of FIG. 3, a first input to the circuit is provided at a voltage sensing terminal 30, which is connected externally to a supply voltage sensing point. Internally the terminal 30 is connected via a fixed voltage drop or the threshold circuit 31 to the input of an analogue to digital converter 32. In practice the supply voltage varies within a voltage output range between limits of, say, 20 and 30 volts, the minimum voltage which the pulse width circuit can compensate is approximately 18 volts. Therefore the fixed voltage drop circuit 31 introduces an 18 volt threshold to the input effectively shifting the range of voltage variation to commence at zero volts thereby utilising the analogue to digital converter 32 to the fullest extent possible.

The converter 32 generates an 8 bit digital representation of a sensed voltage as a parallel output word which is connected to the address input of a programable read only memory (or PROM) 33 which contains a look-up table of digitial words or numbers representing the pulse widths indexed against each of the 8 bit words respresenting a sensed voltage within the operating range. The output from the PROM 33 represents the required pulse width by means of an 8 bit digital number. The represented pulse width is compensated for the sinusoidal current wave-form of the output in accordance with the formula:

$$V_{RMS} = \frac{2V}{\pi} \sqrt{\left(1 - \cos\frac{2\pi\tau}{T}\right)}$$

$\tau$ = pulse width
T = period of signal waveform, and
V = waveform amplitude

The PROM output is used as the parallel preset input 34a to a presetable down counter 34. This counter 34 is also provided with a clock input 34b which determines the count down rate and a third input 34c which controls the reloading of the 8 bit number at 34a to reset the counter. The final output of the counter at 34d comprises a latched output which changes state at the beginning and end of a count period, the counter occupying a first state normally and a second state during the period in which the preset number is counted down.

The counter output 34d is connected to one input of each of two 3-input AND gates 35 and 36, a second input of each of these gates is also connected to a common latched signal line connected to the output of the over-current sensing block 19 in FIG. 1, if the enable/inhibit line. The remaining third output of gate 35 is connected to a frequency signal and the corresponding third input of gate 36 is connected to an inverse of that signal. The respective outputs of the gates 35, 36, in FIG. 3 identified as A and D respectively, provide the switching signals for the switching elements 2 and 5 of the bridge 1, see FIGS. 1 and 2.

In the particular example being described the final output signal is a frequency shift keyed power signal and this is generated by the circuit illustrated in FIG. 4. An FSK signal comprises an output which is switched between alternate frequencies at a modulation rate. In the arrangement of FIG. 4 the keyed frequencies are generated by crystal oscillators 40 and 41 which produce upper and lower frequency signals respectively. The modulation frequency is generated by a third oscillator 42 and a frequency divider 43. The frequency keying at the modulation rate is controlled by a logic gating arrangement generally indicated at 44 and which is of well known configuration. Basically, because it is more convenient to do so, due to the high frequency of the crystal oscillators 40, 41 and 42, the frequency keyed signal produced by the gates 44 is also at a relatively high frequency and is further divided to a lower rate by dividers 45 and 46 the outputs of which are connected to the power control units 12 and 13 (see FIG. 1) respectively. The outputs of these dividers provide the clock signal 34b of FIG. 3, the FSK signals to gate 35 (and 36), and the load signal 34c.

In operation of the illustrated embodiment, in a railway jointless track circuit transmitter, the frequency shift keyed signal is characteristic of the transmitter, a track circuit may have one of five alternative nominal carrier frequencies, for example, 4080 Hz, 4560 Hz, 5040 Hz, 5520 Hz, and 6000 Hz and the upper and lower keyed frequencies are shifted from these nominal frequencies by 40 Hz. In addition each track circuit has a characteristic modulation frequency which may be a constant frequency, or a coded modulation signal, or even an externally variable modulation signal. The corresponding FSK signal is generated by the block 18 in FIG. 1, shown in greater detail in FIG. 4. These signals connected to the power control units 12 and 13 in FIG. 1 operate the switching elements 2, 3, 4 and 5 of the bridge 1 in order to switch current between the nodes 8 and 9 of the bridge and through the primary winding of transformer 10 to supply the power output through inductive coupling with the secondary of the transformer. This current is derived from the voltage supply connected across terminals 6 and 7, which voltage, although normally reasonably stable may lie within and vary between voltage limits of 20 and 30 volts. It is preferred not to employ a fully stabilised voltage supply because the stabilising electronics of such supplies do not permit of fail-safe characteristics so that some failure modes may result in the production of excessive current and/or voltage. An increase in supply voltage to a transmitter, without the power control of the present invention, would boost the transmitter output, which is a wrong side failure. Therefore even a stabilised power supply would have to fail safe in the event of a failure occuring the result of which is a supply voltage increase. The approach of the present invention is preferred and it permits the transmitter to be operated from batteries which cannot provide a stabilised voltage.

The variations of the power supply voltage are compensated by variation of the pulse width of the switching periods of the switching elements 2, 3, 4 and 5 to tend to maintain a constant output power, that is a constant voltage current product in the transformer primary winding arm of the bridge. The instantaneous supply voltage value is sensed by both units 12 and 13 in FIG. 1, one of which is shown in more detail in FIG. 3, and is transformed by the analogue digital converter 32 and the PROM 33 look-up table to a corresponding pulse width on counter output line 34d. The result being that the switching control outputs A. and D. (and also B. and C. in anti-phase) are produced to switch the elements 2 and 5 into a state of production for a pulse width determined in accordance with the given formula.

In the event of a failure of the pulse width control system the power can only increase up to the limit at which the pulse widths overlap since at that point the total current drawn from the voltage supply will exceed the current sensitive rating of the fuse 20 which will then burn out.

The over-current sensing circuit 19 operates in response to a voltage, in excess of a predetermined threshold, developed across resistor 11 in the output branch of the bridge 1and provide either an enable or inhibit logic output connected to the gates 35 and 36 in the power control units 12 and 13, see FIG. 3. It provides protection against the effects of some faults and, for example, installation errors and effectively protects the fuse 20 from the effects of such faults, consequently the fuse is rendered responsive only to failures in the power controller itself.

I claim:

1. A power control circuit comprising a bridge of controllable switching elements, a voltage supply connected to the bridge input terminals, an output circuit connected to the bridge output terminals, a pulse width modulated control means providing two anti-phase control signals, a first of the control signals being connected with the control terminals of a first pair of diagonally opposite bridge switching elements and a second pair of the control signals being connected with the control terminals of a second pair of diagonally opposite bridge switching elements, voltage sensing means responsive to the bridge voltage supply level and operatively connected to the pulse width modulated control means to determine the pulse widths of the control signals to maintain the output power delivered from the bridge at a constant level, said voltage sensing means comprising an analog to digital converter connected with a voltage threshold circuit arranged to provide a zero reference level for the analog to digital converter at a level slightly less than the lower limit of the supply voltage.

2. A power control circuit as claimed in claim 1 wherein the output of the analogue to digital converter is connected to control pulse width timing means in accordance with a digital representation of a measured voltage supply level.

3. A power control as claimed in claim 2 wherein the control pulse width timing means includes conversion means for converting the digital representation of a measured supply voltage to a representation of pulse width calculated according to a predetermined relation.

4. A power control circuit as claimed in claim 3 wherein said conversion means includes a look-up table comprising digital words or numbers representing pulse widths indexed against digital words representing corresponding sensed voltage levels.

5. A power control circuit as claimed in claim 4 wherein the pulse width control means includes a counter arranged to count down the digital number representing pulse width to determine the pulse width of a control signal.

6. A power control circuit as claimed in claim 3 wherein said pulse widths are determined according to the formula $$V_{RMS} = \frac{2V}{\pi} \sqrt{\left(1 - \cos\frac{2\pi\tau}{T}\right)}$$

where
$\tau$ is pulse width,
T is the period of waveform and
V is the waveform voltage.

7. The power control circuit of claim 1 utilizing a railway track circuit signal transmitter wherein the pulse width modulated control means has a first input connected with the voltage sensing means and a second input connected with a frequency shift keyed generator and wherein the output terminals of the bridge are connected to the output of the track circuit signal transmitter to provide a frequency shift keyed track circuit signal.

* * * * *